Oct. 24, 1933.          W. E. LEIBING          1,931,733
                        SEALING DEVICE
                  Filed Jan. 31, 1929      3 Sheets-Sheet 1
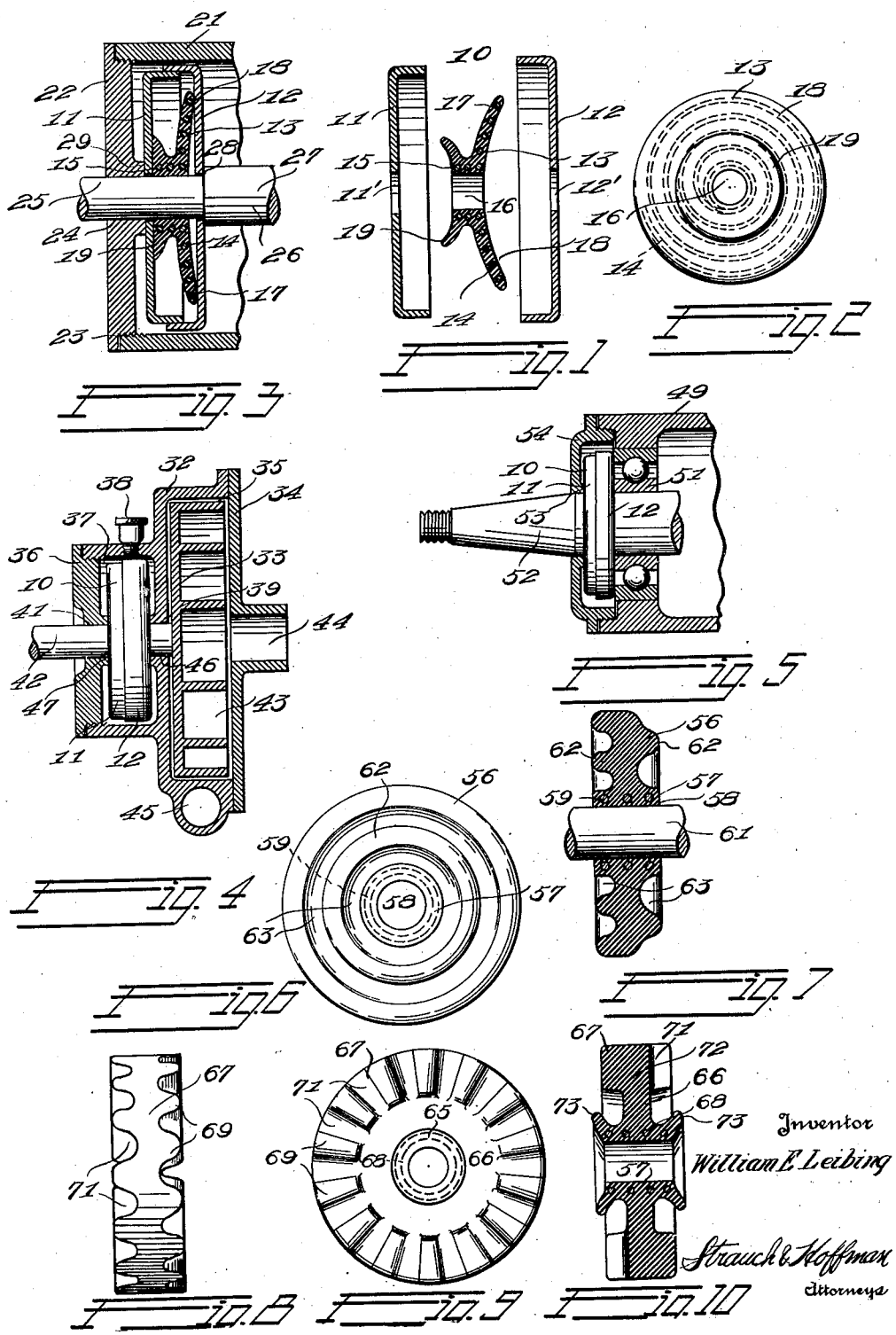

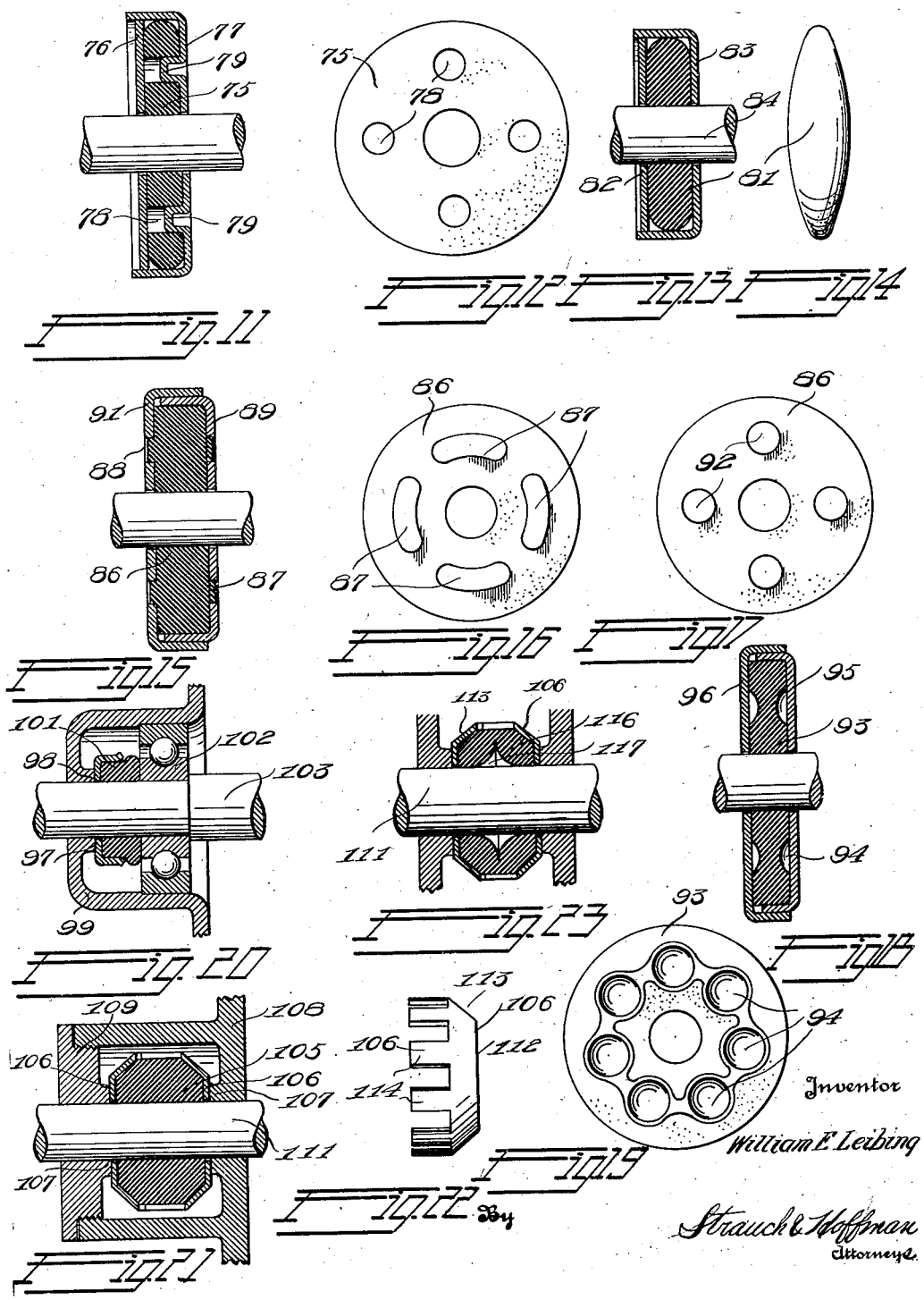

Oct. 24, 1933.   W. E. LEIBING   1,931,733
SEALING DEVICE
Filed Jan. 31, 1929   3 Sheets-Sheet 3

Inventor
William E. Leibing

By Strauch & Hoffman
Attorneys

Patented Oct. 24, 1933

1,931,733

UNITED STATES PATENT OFFICE 1,931,733

SEALING DEVICE

William E. Leibing, Sausalito, Calif.

Application January 31, 1929. Serial No. 336,559

13 Claims. (Cl. 286—7)

The present invention relates to sealing devices.

More specifically, the invention relates to novel means for association with rotating shafts for the prevention of leakage of fluid, such as lubricating oil for example, through the shaft openings in housings which are partially filled with lubricating oil and through which the shafts extend.

Rotating shafts such as rear axle, propelling shafts, pump shafts, transmission shafts, etc. as is well known, are supported in housings which are fluid tight except for the shaft openings. These openings must be sealed against leakage of fluid, such as lubricating oil, or any other fluid, that in operation, should be maintained in the housing in which the shaft is journalled.

It has heretofore been the practice to provide seals or packing for rotating shafts of the above noted character, made of felt rings, leather seals and in some instances, compressed packings that are caused to frictionally engage the shaft.

These forms of packing or seals for rotating shafts have not proven very satisfactory due to the fact that the nature of the seals are such that they must be so mounted as to remain stationary while the shafts rotate with respect thereto with the results that the seals soon wear out and become ineffective resulting, not only, in the loss of lubricant or other fluid, but necessitating frequent renewal with a consequent expenditure of time and money. Furthermore, compressed frictional packings, heretofore used in water pumps, present considerable resistance to the rotating shafts resulting in the generation of heat as well as the ultimate scoring of the shafts, after which it becomes impracticable to seal or pack the shafts effectively for any considerable length of time.

Attempts have heretofore been made to provide seals for rotating shafts to overcome the objections to the forms of packing above referred to, by providing yieldable sealing means held in fluid sealing position on the shaft by means of a spring and in which the spring and sealing means were jointly rotatable with the shaft.

The objections to the former type of packing due to the wearing of the packings by frictional contact of the rotating shaft were overcome, but in the latter type of seal the disposition of the yieldable sealing means relative to the rotating shaft and end members of the housing enclosing the sealing device was such that the yieldable sealing means was subject to friction or wearing contact with the shaft upon endwise movement of the shaft which resulted in scoring or cutting the material of the yieldable sealing means resulting in leaks between the yieldable sealing means and rotating shaft after a comparatively short period of use. Furthermore in the latter type of seal the constructions were such as to necessitate a comparatively long spring in order that it could serve to hold the packing in firm engagement with the shaft, thus requiring considerable space for its assembly and consequently rendering it impractical, in many situations in which limited space is available, such as automatic shafts, pump shafts, motor shafts, pinion shafts, transmission shafts, engine crank shafts etc. Furthermore, in this type of seal, in order to effectively seal the packing to the shaft excessive end thrust pressure was developed on the end walls by said spring resulting in excessive friction and loss of power.

It is a primary object of the present invention to provide a fluid sealing device for rotating shafts which effectively overcomes the above noted objections to seals or packings heretofore used or proposed.

It is a further object of the present invention to provide a fluid sealing device for rotating shafts which can be manufactured at relatively low cost, is easy to install, is compact adapting it to all spaces in which ordinary non-rotative gaskets are mounted under present practices, and which is not subject to excessive wear by unnecessarily heavy frictional contacts.

It is a still further object of the present invention to provide a fluid sealing device for rotating shafts comprising inherently resilient means of a composition not subject to deterioration by contact with lubricating oil or other fluids to be sealed by the device, designed to be non-rotatively held on the shaft mainly by virtue of its own resilience.

With the above objects in view as well as others that will become apparent from the following disclosure, reference will be had to the accompanying drawings in which are illustrated several preferred embodiments of my invention and in which:

Figure 1 is an axial vertical sectional view of a sealing device the parts being shown in separated position forming a preferred embodiment of my invention.

Figure 2 is a left side elevational view of the inherently yieldable sealing member shown in Figure 1.

Figure 3 is an axial vertical sectional view illustrating one application of the sealing device illustrated in Figuure 1.

Figure 4 is an axial vertical sectional view illustrating a further application of the sealing device.

Figure 5 is a similar view illustrating a still further application of the sealing device.

Figure 6 is a side elevational view of a modified form of the inherently yieldable sealing member.

Figure 7 is an axial vertical sectional view of the member shown in Figure 6 in shaft engaging position.

Figure 8 is an edge view of a further modified form of yieldable sealing member.

Figure 9 is a side elevational view of the member shown in Figure 8.

Figure 10 is an axial vertical sectional view of a still further modified form of yieldable pressure member.

Figure 11 is an axial vertical sectional view of a further modified form of sealing device in shaft applied position.

Figure 12 is a side elevational view of the yieldable sealing member shown in Figure 11.

Figure 13 is an axial vertical sectional view of a further modification of sealing device.

Figure 14 is an edge view of the yieldable member shown in Figure 13.

Figure 15 is an axial vertical sectional view of a further modification of sealing device.

Figure 16 is a side elevational view of the cap enclosed yieldable sealing member shown in Figure 15.

Figure 17 is a similar view of a modified form of yieldable sealing member adapted for application according to Figure 15.

Figure 18 is an axial vertical sectional view of a still further modified form of sealing device.

Figure 19 is a side elevational view of the cap enclosed yieldable pressure sealing member shown in Figure 18.

Figure 20 is an axial vertical sectional view showing the application of a further modified form of sealing device.

Figure 21 is a similar view disclosing a further form of sealing device.

Figure 22 is an edge view of one of the caps shown in Figure 21.

Figure 23 is an axial vertical sectional view disclosing the application of a further modified form of sealing device.

Figure 24:
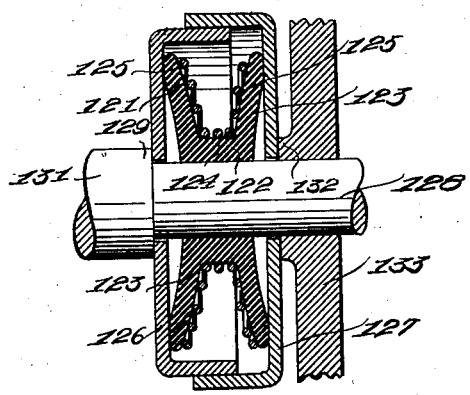
Figure 24 is an axial vertical sectional view of a further modified form of sealing device in cooperation with a shouldered shaft and a boss of an end cap illustrating one of the applications thereof.

Referring to the drawings by reference characters in which like characters designate like parts and referring first to Figures 1 and 2. 10 designates a sealing device comprising telescoping caps 11 and 12 and an interposed cap engaging yieldable sealing member 13.

Each of the caps 11 and 12 is constructed of sheet steel drawn to cup shape as shown and provided with central shaft receiving apertures 11' and 12' respectively. Said caps are carbonized and heat treated to a very hard finish and each cap is ground on its outer surface only on a plane normal or perpendicular to the axis of the shaft to which it is applied. Said surface provides a fluid tight sliding engagement with surfaces later referred to. Member 13 is formed of molded rubber of oil proof stock having incorporated therein a helical wire spring 14, the helical portion 15 of which closely surrounds a central bore 16 in member 13 and the spiral portion 17 of which extends outwardly from one end of helical portion 15 through a thin dished rim portion 18 of member 13 of comparatively large diameter. Member 13 comprises a second dished rim portion 19 adjacent the opposite end of helical portion 15 preferably of less diameter than rim portion 19 and facing oppositely thereto.

One of the many applications of sealing device 10 is illustrated in Figure 3 in which 21 designates a housing provided with a detachable cast iron end cap 22 threadedly engaged therewith as indicated at 23. Cap 22 is provided with a central aperture 24 through which extends the reduced portion 25 of a rotatable shaft 26 provided with an enlarged portion 27 producing a radial annular shoulder 28. Cap 22 is provided with a boss 29 surrounding aperture 24 and the sealing device 10 is disposed within housing 21 between boss 29 of cap 22 and shoulder 28 with cap 12 in engagement with shoulder 28 and cap 11 in engagement with boss 29. Member 13 is in compression between caps 11 and 12 with shaft 26 extending through apertures 11', 12' and 16 of caps 11 and 12 and member 13 respectively. The enlarged portion 27 of shaft 26 may be supported in ball or roller bearing assemblies, the view shown in Figure 3 being for the purpose of disclosing the application of the device as an end seal for a rotatable shaft of any kind. Housing 21 may contain lubricant, in liquid or other form, or any other fluid.

In Figure 4 is illustrated an application of the device 10 for a double end seal wherein 32 designates a water pump casing comprising a medial partition 33 defining with a removable end plate 34 an impeller chamber 35 and with a detachable end cap or plate 36 an oil chamber 37 adapted to receive lubricating oil through a suitable inlet connection 38.

Partition 33 and cap 36 are provided with central longitudinally alined apertures 39 and 41 respectively through which extend a shaft 42 secured at the inner end thereof to an impeller 43 rotatably mounted in chamber 35 which chamber may have an inlet and an outlet 44 and 45 respectively. Partition 33 and cap 36 are provided with inwardly projecting bosses 46 and 47 respectively surrounding apertures 39 and 41 which bosses are engaged by the ground and hardened faces of caps 12 and 11 respectively of sealing device 10, with shaft 42 extending through the aforementioned apertures in caps 11 and 12 and member 13.

In Figure 5 is illustrated the application of the sealing device 10 to a vehicle axle shaft, wherein 49 designates one end of an axle housing provided with a ball bearing assembly 51 through which shaft 52 extends. Device 10 is supported on shaft 52 with cap 12 in firm engagement with inner ring of bearing 51 and cap 11 in engagement with a boss 53 formed on the detachable end cap 54. This is a further application of the sealing device as a single end seal.

The central bore 16 in member 13 is normally of a less diameter than that of the shaft with which member 13 is assembled, so that upon application of the member to the shaft the shaft is tightly gripped by member 13 due to the combined inherent resiliency of the rubber of which the member is constructed and the helical portion 15 of spring 14 thus providing a fluid tight seal between the rotating shaft and member 13 and a firm frictional grip of member 13 on the shaft. Rotation of the member 13 as a unit with the shaft, accordingly takes place.

In the assembly or application of the device in any of the above described installations, cap 12 is first positioned on the shaft after which member 13 is forced along the shaft into engagement with the inner face of cap 12.

The rim of dished portion 17 insures a satisfactory fluid tight contact between member 10 and the inner face of cap 12 without requiring that the body of the dished portion of the sealing member be pressed against said face. A satisfactory joint is thus easily provided in spite of any difficulty in moving the yieldable sealing member axially of the shaft in view of the close fit thereon, as above described. The cap 11 is then moved along the shaft into engagement with the opposite face of member 13, and caps 11 and 12 are brought in telescoping relation upon application of the housing end plate or cap which causes a deformation of the rims of dished portions 18 and 19 of member 13 resulting in a fluid tight seal between member 13 and the contacted faces of caps 11 and 12. The inherent resiliency of member 13 together with the resiliency of spiral portion 17 of spring 14 maintains caps 11 and 12 in fluid tight sealing relation with the boss or bosses engaged by the outer ground faces of caps 11 and 12.

Because of the provision of the comparatively thin dished rim portion 18 reinforced by spiral spring 17 the inner face of cap 12 is uniformly engaged by the entire outer circumference of portion 18 in fluid sealing relation and the engagement of rim portion 18 with cap 12 will exert a comparatively light pressure on cap 12 tending to move its hardened outer surface against the boss or shoulder provided to resist such pressure. The area of contact between the shoulder or boss and the outer surface of cap 12 may be made small, minimizing friction at these points.

Similarly, because of the provision of rim portion 19 on member 13 cap 11 may be readily engaged by member 13 in fluid tight relation without the necessity for setting up any substantial end pressure on the sealing member and thus increasing frictional resistance to the rotation of the shaft to which the sealing ring may be applied. A fluid sealing engagement between cap 11 and member 13 will result even if member 13 is not screwed squarely to its fully seated position.

The sealing device above described is designed for installation under light pressure with corresponding low friction in situations where light pressure and low friction are necessary, as in automobile constructions, in which lubricating oils may develop considerable heat in use causing the development of only low pressures that permit the use of such a device.

The sealing device 10 is especially applicable to rotating shafts provided with longitudinally adjustable pinion gears due to the fact that rim portion 18 will permit substantial relative telescoping movement of caps 11 and 12 without substantial change of outward pressure on the caps. Said device accordingly permits adjustment of the gears.

The apertures 11' and 12' in caps 11 and 12 are of slightly larger diameter than the shaft extending therethrough to permit proper seating of the caps both with respect to member 13 and the bosses engaged by the outer faces of the caps.

In operation, the yieldable sealing member 13 rotates with the shaft. Said member, through its frictional engagement with caps 11 and 12, exceeding the friction between the caps and engaged bosses, imparts rotation to the caps with the result that the only friction present is that between the outer ground and hardened faces of the caps and the adjacent faces of the bosses. The bosses are constructed preferably of cast iron providing a very desirable thrust bearing surface which is fluid tight, enduring, and that does not develop much heat. The lateral expansibility of member 10 automatically takes up any wear of the bosses.

It will be seen that the sealing device 10 is of substantially small length axially thus adapting it for ready use in any standard gland or stuffing box spaces.

It will be obvious that the thickness of rim portions 18 and 19 of member 13 may be varied as well as the gauge of the spring 14 for providing pressures to suit any need. Furthermore, the construction is such that an effective seal will be provided with the rotating shaft without excessive end pressure on caps 11 and 12, since the firm contact between the shaft and its surrounding sealing member is due to the inherent yieldability of the material of which it is made and the fact that the opening in said member is made slightly smaller than the diameter of the shaft to which it is applied. Spring 15 also serves to hold said member in firm contact with the shaft, especially when the rubber or composition loses its natural resiliency in any degree. Accordingly no pressure need be exerted endwise of the shaft and resisted by the caps 11 and 12 to provide satisfactory non-rotative engagement between the shaft and said member.

In Figures 6 and 7, is illustrated a yieldable pressure sealing member 56, adapted for relatively heavy pressures. As illustrated, said member is provided with a hub portion 57 having a shaft engaging bore 58 closely surrounded by a helical spring 59 molded in the rubber composing member 56 and adapted to function as the helical portion 15 of spring 14 above described, for aiding the contractive action of member 56 in gripping the shaft 61 in tight fluid sealing relation.

The member 56 outward of hub 57 is provided, on opposite faces thereof, with circumferential ribs 62 and alternating circumferential grooves 63, the ribs and grooves on one face of the member being staggered radially relative to the ribs and grooves on the opposite face thereof.

As will be noted both the hub 57 and ribs 62 are of substantial thickness whereby upon deformation thereof upon inward pressure by the caps 11 and 12 in assembling, an outward pressure of the same magnitude will be exerted on the caps for forcing the outer ground faces thereof into substantially tight sliding fluid sealing engagement with the contacted bosses.

By the provision of the alternating ribs and grooves, the ribs as well as hub 57 upon pressure thereto by caps 11 and 12 are flattened and expanded into the grooves whereby the deformed member 56 may be made to exert substantial outward pressure on the confining caps 11 and 12 in accordance with the need therefor.

By arranging the ribs and grooves on one face of member 56 in radially staggered relation to the ribs and grooves on the opposite face, a more ready and uniform flow of the rubber is provided, thus giving a better and more uniform pressure on the confining caps 11 and 12.

In Figures 8 and 9 is illustrated a further modification of the yieldable pressure sealing member which comprises a hub 65, a central disk portion 66, and a corrugated rim portion 67.

The hub 65 is provided with a helical spring 68 as in the form disclosed in Figure 7 and the corrugated rim 67 comprises alternating radially disposed ribs 69 and grooves 71 with those on one face staggered with respect to those on the opposite face.

This form of yieldable pressure member provides a relatively heavy pressure on the enclosing caps and is accordingly well adapted to locations where heavy pressures are desirable.

In Figure 10 is disclosed a yieldable pressure member 72 of the same configuration as that disclosed in Figures 8 and 9 except that a dished flange or rim 73 similar to that disclosed in Figure 1 is provided on each end of hub 57.

This form is applicable for heavy pressures which may be made variable in accordance with the extent of outward projection of flanges 73. As shown, flanges 73 project considerably beyond the planes of the opposite faces of rim 67 in consequence of which the caps 11 and 12 will be engaged by flanges 73 in advance of rim 67 providing a tight joint between the caps and sealing member.

For lighter pressures, the flanges 73 may be constructed for engagement with the caps simultaneously with or prior to the frictional engagement of the opposite faces of rim 67 with the caps.

In Figures 11 and 12, is illustrated another form of sealing device comprising a disk shaped yieldable sealing member 75, a disk plate 76, and a cap 77 with the flange or rim portion thereof in surrounding relation to the periphery of member 75 and plate 76 and with member 75 in applied or operative position disposed between plate 76 and cap 77.

In this form of the invention a positive connection is made between the sealing member 75 and plate 76. Said connection comprises a plurality of transversely disposed apertures 78 is member 75 that increase the resilience of said member. Some or all of said apertures may receive inwardly pressed lugs 79 on cap 77. Or some may receive such lugs on cap 77 while the others may receive like lugs on plate 76, if desired. The apertures 78 not only function as driving means but also provide space for the flow of the rubber composing member 75 thus allowing for a greater compression of member 75, when it is forced on the shaft snugly after the manner above described.

In Figures 13 and 14 is illustrated a further form of sealing device, adapted for relatively greater pressures than the form illustrated in Figures 11 and 12. In these figures, a yieldable pressure sealing member 81 is provided which as shown is substantially elliptical shaped in section or edge view and circular in side elevation thus providing space between disk plate 82 and cap 83 of increasing dimensions toward the peripheries thereof for the flow of the rubber upon compression of member 81 between plate 82 and cap 83, thus permitting substantial compression or deformation of member 81 with a resulting compression of the rubber or similar material to cause a tighter grip on shaft 84 as well as substantial outward pressures on plate 82 and cap 83 for providing a tight fluid seal with the bosses surrounding the shaft openings, such as boss 29 (Figure 3) or bosses 47 (Figure 4).

In Figures 15 and 16 is illustrated a still further form of sealing device in which an inherently yieldable pressure sealing member 86 is provided which is of disk formation and provided on opposite faces thereof with circularly arranged elongated driving lugs 87 adapted to seat in correspondingly shaped openings 88 in telescopically related caps, 89 and 91, similar in function to the caps heretofore described for imparting rotation to the caps.

Instead of the elongated lugs 87, member 86 may be provided with circular lugs 92 as indicated in Figure 17 for engagement within similarly shaped openings in caps 89 and 91.

In Figures 18 and 19 is illustrated a still further modified form of sealing device which is adapted for low thrust pressure and in which an inherently yieldable pressure sealing member 93 is provided which is of disk formation and provided on each face thereof with a circular series of vacuum cup depressions 94 which provide driving engagement with caps 95 and 96 as well as provide space for the flow of the rubber upon deformation of member 93.

In Figure 20 is illustrated a sealing device adapted for a single end seal and which as shown comprises a single cap 97 forced into fluid tight sealing engagement with a boss 98 on housing 99 by a yieldable pressure sealing member 101 compressed between cap 97 and the inner ring of a bearing assembly 102 supported on shaft 103. As in all of the other forms of the invention the member 101 is provided with an opening of smaller diameter than the diameter of the shaft so that when said member is forced on the shaft it provides not only a fluid tight joint between the shaft and member, but that it will grip the shaft so that said member will rotate as a unit therewith.

In Figures 21 and 22 is illustrated a still further modified form of sealing device which is adapted for a double end seal and which comprises a yieldable sealing member 105 confined between caps 106 of like formation, the opposite outer ground faces of which are thrust into fluid tight engagement with bosses 107 formed on a cast iron housing 108 and cast iron end cap 109 about central bores therein through which the rotating shaft 111 extends.

Each of the caps 106, as more clearly illustrated in Figure 22, comprises a centrally apertured disk portion 112 integrally connected at the periphery thereof with the inner edge of a conical flange or rim portion 113 from the opposite or outer edge of which project spaced tongues 114, the spaces between which are of substantially the same width as the tongues whereby the tongues of one cap may engage and move between the tongues of the other cap.

The caps 106 are constructed of sheet steel, stamped and drawn to the shape illustrated and then carbonized and heat treated in the same manner as caps 11 and 12.

It will be observed that the inherently yieldable member 105, which may be made slightly larger than necessary to fill the space between caps 106 is compressed toward the axis of the shaft by the cooperating conical flanges 113 due to the fact that the outer edge of said member is wedged between said flanges as the caps are forced toward each other by the adjustment of member 109.

In Figure 23 is illustrated a form of sealing device similar to that disclosed in Figure 21, wherein the yieldable pressure member 116 is molded with an inwardly opening channel 117 normally of substantially U-shape in cross section allowing for substantial deformation of the member 116 between caps 106 by flow of the rubber within the channel 117 under the wedging action of the oppositely disposed conical flanges 113 as above described.

In Figure 24 is illustrated a form of sealing device embodying a yieldable sealing member 121 which comprises a central hub portion 122 and oppositely disposed outwardly dished disk portions 123 preferably integral with the opposite end of hub portion 122. A coil spring 124 snugly surrounds hub portion 122 and spring 124 at opposite ends thereof is extended in the form of spirals 125, each of which engages under pressure the inner face of one of the disk portions 123. A pair of telescoping caps 126 and 127 encloses member 121 as in other forms of the invention and the sealing device comprising the yieldable member 121 and cooperating caps 126 and 127 is illustrated in position on the reduced portion 128 of a rotating shaft with caps 126 and 127 firmly engaging a shoulder 129 defined by the enlarged portion 131 and the reduced portion 128 of the rotating shaft and a boss 132 on an end plate 133 respectively.

The inherent resiliency of member 121 provides a fluid seal between the hub portions 122 thereof and the rotating shaft and the margins of disk portions 123 provide a fluid seal between member 121 and caps 126 and 127 as well as urging the caps into firm sealing contact with shoulder 129 and boss 132.

The spring comprising coil portion 124 and spiral portions 125 assist the inherent resiliency of member 121 in providing the fluid seals above noted as well as urging caps 126 and 127 into fluid sealing engagement with shoulder 129 and boss 132. The spring may if desired be moulded into the material of member 121 as indicated in Figures 1 and 3 but preferably as illustrated is coiled within the outwardly flaring walls forming a channel between disk members 123. This arrangement provides a cheaper construction capable of producing equally as good results.

In accordance with this construction any end play in the rotating shaft causes telescoping movement of caps 126 and 127 relative to each other but such end movement, which is of comparatively small magnitude, does not cause movement of hub portion 122 longitudinally of the rotating shaft because the hub portion does not contact with the caps, but merely causes a flexing of the margins of the dished portion 123. When the device is mounted between a shaft shoulder and end plate boss as represented, as in the majority of automobile installations the movement of the shaft endwise merely increases or decreases the external diameter of portions 123 slightly with caps 126 and 127 always maintained in fluid sealing relation.

Upon endwise movement of the rotating shaft the hub portion 122 of member 121 is moved therewith resulting in an increase of spring tension on one side and a decrease on the other, such unequal tensions in the spring becoming automatically equalized upon movement of the shaft in the opposite direction.

It is to be particularly noted upon reference to Figure 24 that the points of frictional contact of caps 126 and 127 with shoulder 129 and boss 132 are close to the rotating shaft while the points of frictional drive between member 121 and caps 126 and 127 is at a substantial distance from the axis of the shaft thus providing a substantial leverage insuring rotary motion of caps 126 and 127 as a unit with the rotating shaft, because the forces tending to rotate the caps under this condition greatly exceed the forces tending to maintain them from rotating with the shaft.

Figure 25:
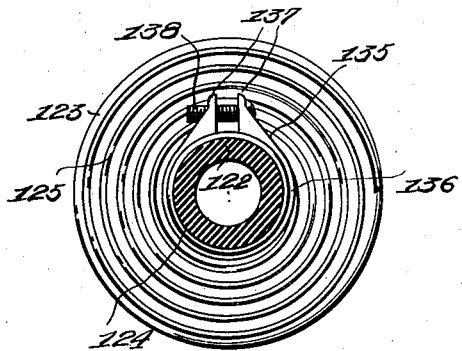
Figure 25 is a transverse sectional view of a yieldable sealing member similar to that illustrated in Figure 24 but disclosing clamping means associated therewith.
Figure 26:
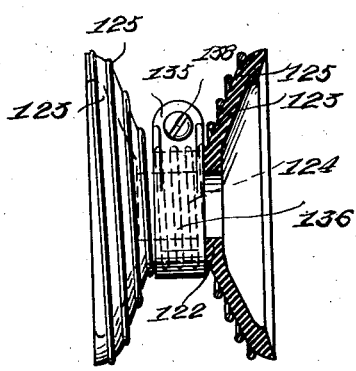
Figure 26 is a view of the structure illustrated in Figure 25 partially in side elevation and partially in longitudinal section.
Figure 27:
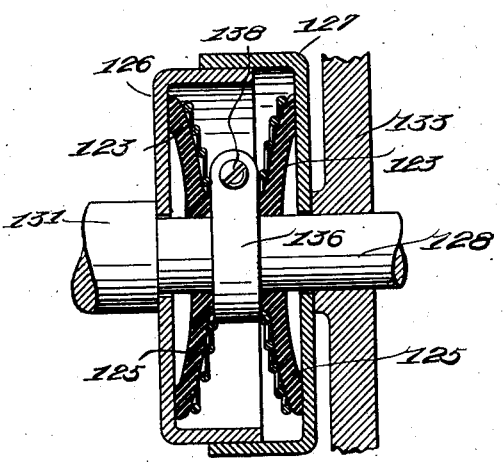
Figure 27 is an axial vertical sectional view of the yieldable sealing member illustrated in Figures 25 and 26 in cooperation with telescoping caps which with the yieldable sealing member constitute a sealing device, the sealing device being illustrated in operative position similar to that indicated in Figure 24.

In installations where comparatively high pressures exist the yieldable sealing member 121 has associated therewith a detachable clamp 135 as illustrated in Figures 25, 26 and 27 which may be of any suitable construction but preferably comprises a split sheet metal band 136 provided with terminal flanges 137 having threaded apertures for the reception of a screw 138 by means of which band 136 may be clamped into engagement with coil spring 124 surrounding hub portion 122 with varying degrees of pressure, thus compressing the hub portion with an adjustable degree of pressure into contact with the shaft.

By the provision of the clamp any desired pressure may be readily held without increasing the friction between caps 126 and 127 and shoulder 129 and boss 132 respectively. It has in fact been found that a substantially light end thrust is sufficient in the presence of a substantially high pressure.

It is to be noted that the caps 126 and 127 are of a substantially light construction and the central bores in the caps through which the rotating shaft extends are of a diameter to provide a sufficiently loose fit such that during endwise movement of the shaft to cause separation of caps 126 and 127 cap 126 will immediately follow the shaft and thus be constantly maintained in engagement with shoulder 129.

This feature is of great value in connection with automobiles in which a certain amount of endwise movement of the shaft is desirable and where due to load variations a very rapid oscillation is set up in the shafts.

From the foregoing disclosure, it will be seen that a sealing device is provided which is simple in construction, effective in operation, durable, and is compact thus adapting it to any stuffing box or gland space of dimensions now provided in practice.

While I have herein disclosed several specific forms of my improved sealing device as well as several specific applications thereof, it is to be understood that it is capable of many other forms and applications. Essential features of the invention reside in the use of a molded yieldable sealing and pressure member adapted through the inherent resiliency thereof to seal itself fluid tight and non-rotatively on a rotating shaft and serving at the same time to force metallic end caps axially of the shaft into fluid tight bearing engagement with surfaces preferably of small area on a portion or portions of a shaft supporting housing.

The yieldable sealing member provides a frictional drive between the rotating shaft and the complete sealing device whereby destructive frictional engagement is entirely avoided since the only friction present is that between the comparatively small bosses and adjacent hardened ground surfaces of caps which are yieldingly maintained in fluid sealing contact with the bosses by pressure of the yieldable pressure member.

The device when operatively assembled will be thoroughly efficient for an indefinite period of time since the yieldable pressure and sealing member is molded of oil proof stock and is not subject to any wear.

The resulting wear will occur between the hardened caps and cast iron bosses without destruction of the sealing member. A fluid seal will always be maintained between these parts due to the inherent pressure in a plurality of directions exerted by the yieldable member on the caps and shaft.

It will be obvious that the yieldable sealing members may be formed of any desired weight or configuration to suit the requirements of the use to which the device is put. Similarly the shape of the caps may be varied to suit conditions under which it is used.

While I have disclosed certain specific embodiments of my invention, such are to be considered as illustrative only, and not restrictive. The scope of my invention is indicated by the terms of the appended claims.

What I claim and desire to secure by U. S. Letters Patent is:—

1. In combination with a housing provided with an apertured end cap and a boss surrounding said aperture, a rotatable shaft extending through said aperture and provided with a shoulder adjacent to but spaced from said cap, of a fluid sealing device non-rotatively supported on said shaft between said boss and said shoulder; said fluid sealing device comprising spaced caps loosely supported on said shaft and inherently resilient means hollowed out around said shaft disposed between said caps in fluid sealing engagement with said shaft and presenting flexible portions contacting with said caps over narrow annular areas and yieldably urging said caps into contact with said boss and said shoulder respectively for providing a fluid seal between said boss and one of said caps.

2. The combination defined in claim 1. in which said caps are telescopically related for housing said means.

3. In combination with a shaft supporting housing provided with alined apertures surrounded by inwardly projecting bosses providing annular bearing surfaces of relatively small area, a rotatable shaft journaled in said apertures, of a sealing device supported on said shaft between said bosses; said sealing device comprising a pair of centrally apertured metallic boss engaging members loosely mounted on said shaft and a centrally apertured yieldable member interposed between said metallic boss engaging members in fluid sealing non-rotative engagement with said shaft and provided with cup-like projections the rims of which yieldably urge said metallic boss engaging members into fluid sealing contact with said bosses.

4. In combination with a housing provided with apertured end walls, inwardly facing bosses presenting annular bearing surfaces of relatively small area surrounding said apertures, a rotatable shaft extending through said housing and journalled in said apertures, of a sealing device supported by said shaft and rotatable therewith; said sealing device comprising boss engaging caps longitudinally movable on said shaft; and a moulded rubber sealing and pressure member yieldably engaging said shaft under fluid sealing pressure; said sealing and pressure member interposed between said caps and provided with annular rims widely spaced from said shaft and yieldably urging the caps into fluid sealing contact with said annular surfaces of said bosses.

5. A sealing ring to prevent the escape of fluid along a rotating shaft comprising an inherently resilient member non-rotatively mounted on said shaft so that it is caused to be held thereon by the inherent resilience of said member and hollowed out around said shaft to present an annular rim substantially spaced from said shaft, and metallic means provided with a bearing surface extending in a plane substantially normal to the axis of said shaft contacting with the rim of said member so that when the ring is in operative position said means is resiliently pressed in fluid tight contact with a cooperating bearing surface by said inherently resilient member.

6. A sealing ring assembly for preventing the escape of fluid around a rotating shaft, comprising a deformable member which has a radiating flexible portion and which is provided with an aperture of a diameter slightly less than the diameter of the shaft for which it is designed, so that when said member is applied to said shaft it will be sealingly mounted thereon; a spirally and radiatingly wound spring associated with said member to yieldingly urge said flexible portion of the latter axially of the shaft; and means pressed in a direction endwise of said shaft by said flexible member and said spring to prevent the flow of fluid around said member.

7. A sealing ring assembly for preventing the escape of fluid around a rotating shaft, comprising two metallic elements each provided with an external bearing surface substantially normal to the axis of said shaft; and an axially deformable and resilient member disposed between said elements; said member comprising a central portion designed to sealingly engage said shaft and rotate as a unit therewith, and an integral radially extending portion encircling the shaft and sealingly engaging said metallic elements to yieldingly resist movement of the latter toward each other.

8. A sealing device for a rotating shaft comprising an inherently resilient member in non-rotative fluid sealing engagement with said shaft; and metallic sealing means in surface engagement with and arranged to be pressed outwardly axially of said shaft by said resilient member; said metallic means having a radially extending smooth surface of a diameter substantially greater than the diameter of the corresponding engaging surface of said member so that, upon inward axial movement of said metallic means, the resilient member may be deformed radially to a substantial degree without being caused to move bodily axially of said shaft.

9. In combination with a housing end plate provided with an aperture and a boss surrounding said aperture; a rotatable shaft extending through said aperture and provided with a shoulder adjacent to but spaced from said boss, of a fluid sealing device non-rotatively supported on said shaft between said boss and said shoulder; said fluid sealing device comprising spaced caps loosely supported on said shaft and resilient means disposed between said caps in fluid sealing engagement with said shaft due to the inherent resilience of said means and at the same time yieldably urging said caps into contact with said boss and said shoulder respectively for providing a fluid seal between said boss and one of said caps; said resilient means engaging said shaft in spaced relation to said caps.

10. The construction defined in claim 9 in which auxiliary or supplementing resilient means are detachably associated with said first resilient means.

11. A sealing device for a rotating shaft comprising an inherently resilient member in nonrotative frictional fluid sealing engagement with said shaft; a coil spring surrounding a portion of said member to supplement its inherent resiliency in a plurality of directions, and means for compressing said resilient member for adjustably varying said frictional engagement of said resilient member with said shaft.

12. Means for sealing a rotary shaft at the point from which it projects from a fixed bearing for said shaft, comprising an inherently compressible and resilient member snugly surrounding said shaft, means including a coil spring to press said member toward the axis of said shaft so that said member will rotate therewith and to press said member in a direction extending endwise of said shaft, and a metallic cap housing said compressible member and means, and disposed between said compressible member and an end of said fixed bearing so as to slide against said end upon rotation of said shaft under pressure exerted thereagainst by said member and means, said cap having a hardened bearing surface where it contacts with said end.

13. Means for sealing a rotary shaft at the point from which it projects from a fixed bearing for said shaft, comprising an inherently compressible and resilient member in the form of a sleeve snugly surrounding said shaft and a cup-like element attached to said sleeve, means including a coil spring to compress said sleeve and supplement the resilience of said cup-like element, and a metallic cap bearing against the rim of said cup-like element over a narrow area of annular form and caused thereby to be pressed against an end of said fixed bearing.

WILLIAM E. LEIBING.